United States Patent [19]

Melgoza

[11] Patent Number: 4,478,159
[45] Date of Patent: Oct. 23, 1984

[54] APPARATUS FOR PLANTING SEEDS AND THE LIKE

[76] Inventor: Raymond Melgoza, P.O. Box 443, Coalinga, Calif. 93210

[21] Appl. No.: 534,668

[22] Filed: Sep. 22, 1983

Related U.S. Application Data

[63] Continuation of Ser. No. 305,956, Sep. 28, 1981, abandoned.

[51] Int. Cl.³ ............................................. A01C 5/06
[52] U.S. Cl. ...................................... 111/52; 111/60
[58] Field of Search .................................. 111/1, 8–14, 111/52, 53–85, 88, 15, 86, 87

[56] References Cited

U.S. PATENT DOCUMENTS

| | | |
|---|---|---|
| 575,863 | 1/1897 | Studebaker . |
| 1,120,087 | 12/1914 | Roemer ................................. 111/88 |
| 2,429,841 | 10/1947 | Phillips ................................. 111/59 |
| 2,691,353 | 10/1954 | Secondo ............................... 111/85 |
| 2,732,975 | 1/1956 | Balzer ................................... 111/77 |
| 2,924,188 | 2/1960 | Hodges ................................. 111/62 |
| 3,048,132 | 8/1962 | Morgan et al. ...................... 111/77 |
| 3,140,678 | 7/1964 | Morris .................................. 111/52 |
| 3,200,778 | 8/1965 | Whelchel ............................. 111/85 |
| 3,465,828 | 9/1969 | Harris ................................... 172/70 |
| 3,742,877 | 7/1973 | Coffee .................................. 111/6 |
| 3,841,244 | 10/1974 | Tye ....................................... 111/85 |
| 3,851,802 | 12/1974 | Marshall ............................... 111/77 |
| 4,043,281 | 8/1977 | Sorlie et al. .......................... 111/85 |
| 4,051,792 | 10/1977 | Brandt et al. ........................ 111/85 |
| 4,078,504 | 3/1978 | Tye ....................................... 111/69 |
| 4,149,475 | 4/1979 | Bailey et al. ......................... 111/66 |
| 4,196,679 | 4/1980 | Moore .................................. 111/85 |
| 4,217,835 | 8/1980 | Fox ....................................... 111/85 |

Primary Examiner—James R. Feyrer
Attorney, Agent, or Firm—Rodney K. Worrel; Matthew L. Ajeman

[57] ABSTRACT

An apparatus for planting seed having a frame adapted to be mounted on a vehicle for transport over the earth in a predetermined direction of travel, a source of seed, a furrowing assembly, an arm borne by the frame mounting the furrowing assembly for movement to and from earth engagement when the frame is mounted on a vehicle, and a conduit interconnecting the source of seed and the furrowing assembly for distributing seed from the source into a furrow formed in the earth by the furrowing assembly during transport of the frame with the vehicle over the earth.

9 Claims, 7 Drawing Figures

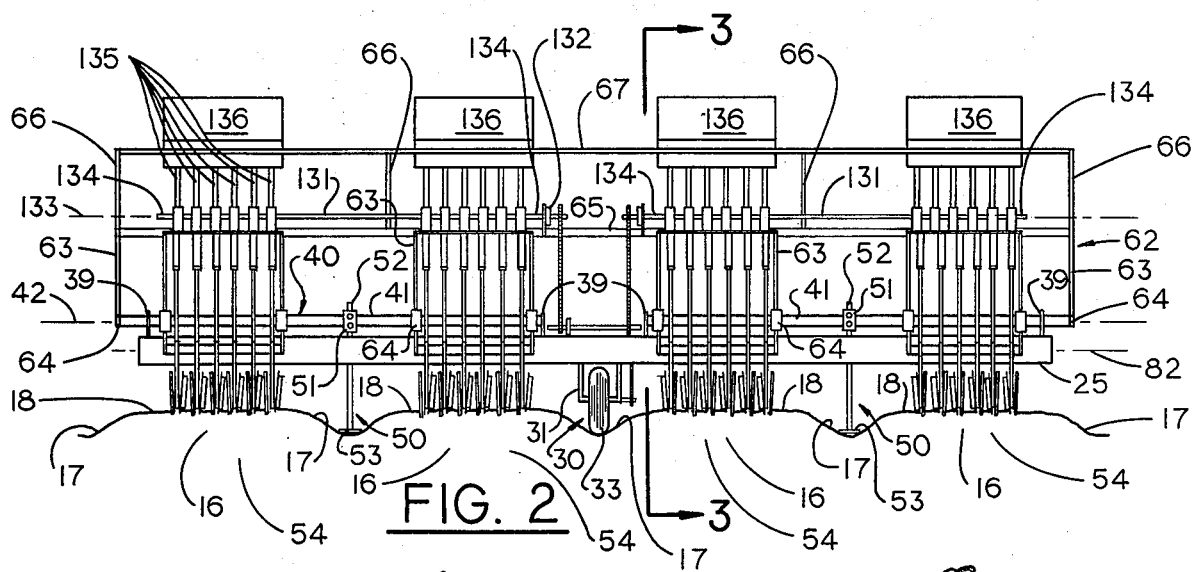
FIG. 2
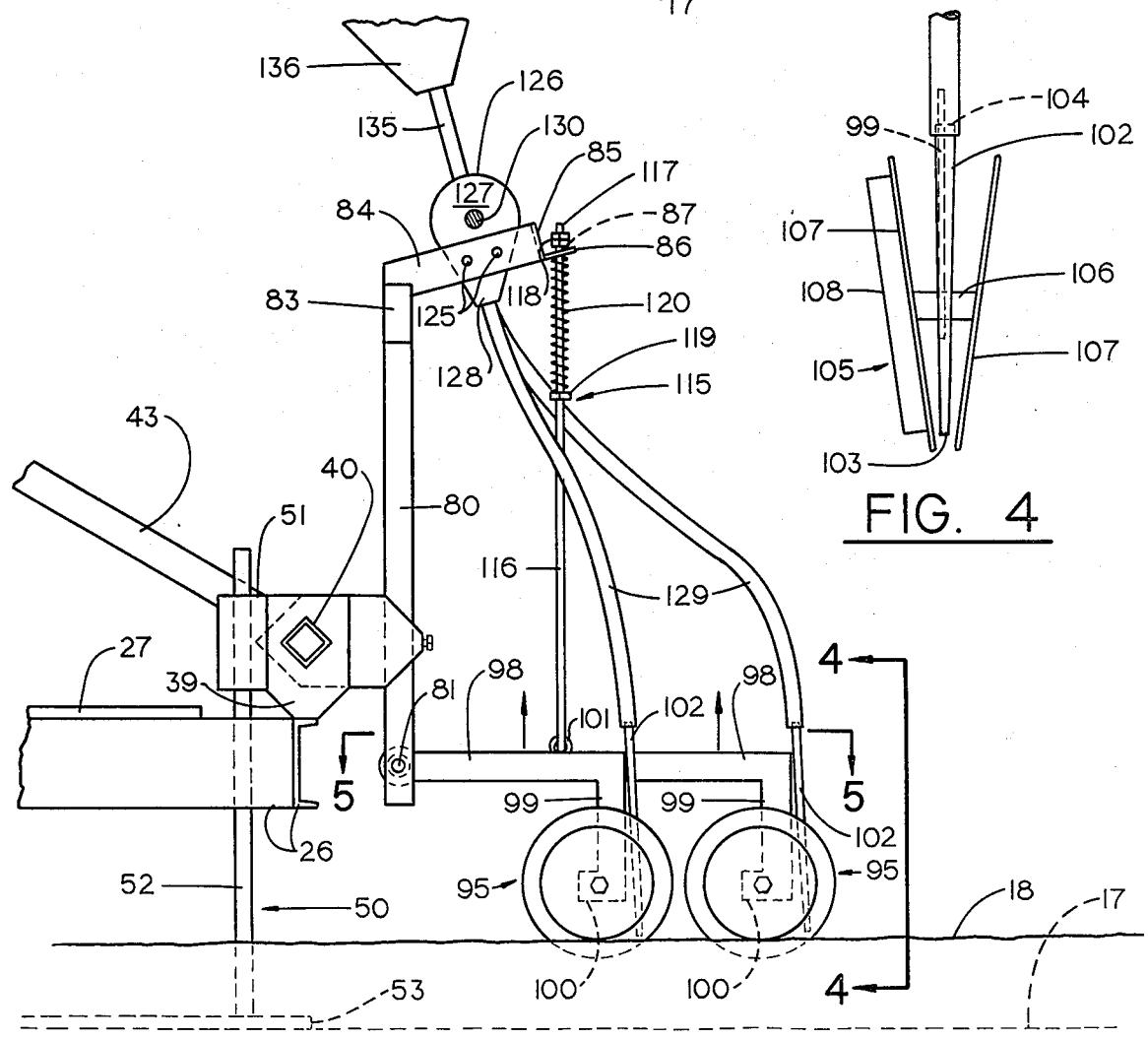
FIG. 4
FIG. 3

APPARATUS FOR PLANTING SEEDS AND THE LIKE

This is a continuation of application Ser. No. 305,956, filed Sept. 28, 1981, now abandoned.

BACKGROUND OF THE INVENTION

1. Field Of The Invention:

The present invention relates to an apparatus for planting seeds and the like and more particularly to such an apparatus which is particularly well suited to planting extremely fine seeds such as onion seeds in a plurality of substantially parallel beds of earth during movement thereover and being adjustable in such a manner as to permit rapid modification of the operative components thereof without substantial disassembly of the apparatus and further which possesses the ability automatically to free itself of debris enountered during passage over the beds of earth.

2. Description Of The Prior Art:

Agricultural devices for planting seeds on an automated basis have long been known, but have been characterized by various problems which interfere with fully dependable and trouble free operation. One problem which is particularly nagging is that of the planting heads becoming encumbered by debris such as trash, rocks, hardpan and the like. Although it has been known to use planting heads which can pivot upwardly, in practice, such devices have not operated dependably to free themselves from such obstacles.

Another problem characteristic of seed planting devices has been the inability, without substantial reconstruction, to adjust the operative components of the devices to achieve different planting patterns and operative effects. This severely limits utility of such prior art devices in that reconstruction requires substantial downtime during which, of course, the equipment is inoperative. In other instances, it is impossible, as a practical matter, to reconstruct the device for alternate planting patterns.

These and other inadequacies in prior art devices result in part from their characteristically cumbersome structure which detracts from their utility and dependability.

Therefore, it has long been known that it would be desirable to have an apparatus for planting seeds and the like which is of quite simple and dependable construction operating in such a manner as automatically to free itself of debris encountered during operation without interfering with operation of the apparatus, which can be adjusted to achieve different planting patterns without substantial reconstruction of the apparatus and which operates in a fully dependable and effective manner.

SUMMARY OF THE INVENTION

Therefore, it is an object of the present invention to provide an improved apparatus for planting seeds and the like.

Another object is to provide such an apparatus which operates automatically to free itself of debris encountered during the planting operation without interfering with such operation of the apparatus.

Another object is to provide such an apparatus which can adjust to elevational deviations encountered during the planting operation within preselected limits.

Another object is to provide such an apparatus which is particularly well suited to planting extremely fine seed such as onion seed.

Another object is to provide such an apparatus which employs a seed metering device mounted in a position remote from the earth so as not to become clogged with extraneous material during use.

Another object is to provide such an apparatus which can be adjusted so as to be operable to achieve other planting patterns without substantial disassembly of the apparatus or substantial reconstruction thereof.

Another object is to provide such an apparatus which uses a multiplicity of planting heads arranged in such a manner as to be capable of simultaneously planting seeds in a plurality of rows individual to a plurality of beds of earth and which has the planting heads arranged in such a manner as positively to cause the earth to cover certain rows in which seeds have already been deposited without the necessity of using other equipment for the purpose.

A further object is to provide such an apparatus which is of quite lightweight and simplified construction capable of operating automatically to perform its various functions without requiring close supervision by personnel.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 2 is a rear elevation of the apparatus viewed in FIG. 1.

FIG. 3 is a somewhat enlarged, fragmentary vertical section taken on line 3—3 in FIG. 2.

FIG. 4 is a somewhat further enlarged, fragmentary rear elevation taken on line 4—4 in FIG. 3.

DESCRIPTION OF THE PREFERRED EMBODIMENT

Figure 1:
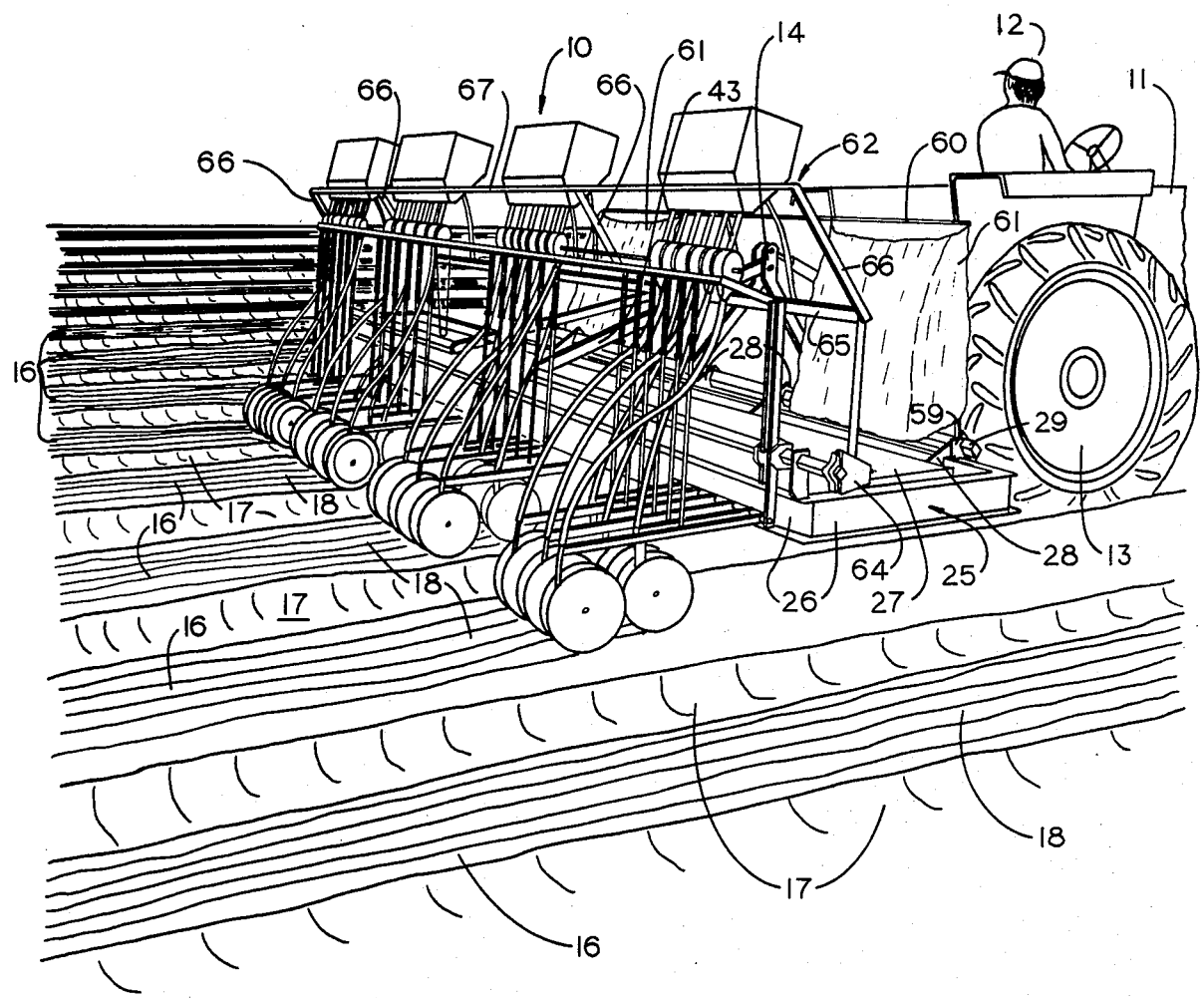
FIG. 1 is a perspective view of the apparatus of the present invention shown in a typical operative environment.

Referring more particularly to the drawings, the apparatus of the present invention is generally indicated by the numeral 10 in FIG. 1. As shown therein, the apparatus is mounted in a typical operative environment on a tractor 11 having an operator 12. The tractor has rear drive wheels 13 and an A-frame or three point hitch 14 of conventional design which can be elevationally adjusted in the conventional manner using the hydraulic system of the tractor.

As shown in FIG. 1, the tractor is moving in a normal direction of travel generally from left to right through a field which has been prepared for planting. The field has a plurality of parallel beds of earth 16 separated from each other by parallel furrows 17. Each of the beds of earth has a substantially flat horizontal upper surface 18. The upper surfaces of the beds are disposed in substantially the same horizontal plane.

The apparatus 10 has a main frame or platform 25. The platform is composed of a channel iron frame 26 of a rectangular configuration and a floor 27 secured on the channel iron frame in covering relation to most, but not all of the frame. Four mounting plates 28 are affixed on the channel iron frame 26 extending forwardly and upwardly therefrom, as shown in FIG. 1. A front tool bar 29 is mounted on the plates 28 extending parallel to the longitudinal axis of the rectangular channel iron frame.

Figure 7:
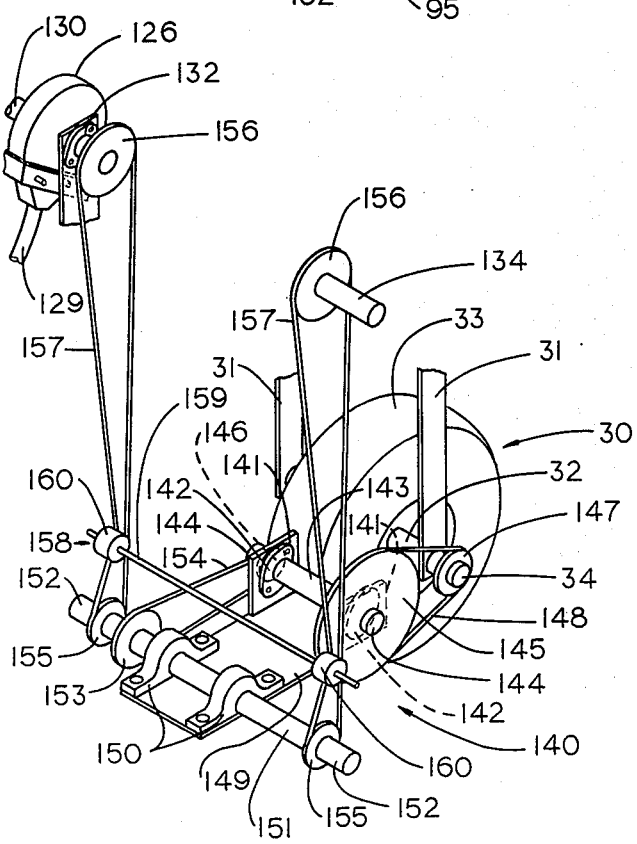
FIG. 7 is a fragmentary perspective view showing the drive wheel and drive assembly of the apparatus.

A wheel assembly 30 is mounted on the underside of the channel iron frame 26 substantially centrally thereof. The wheel assembly has a mounting frame 31 in which is journaled an axle 32 on which is mounted a wheel 33 disposed for rolling ground engagement and fixed to rotate with the axle in the mounting frame. The axle has a right terminal end 34 extending through and beyond the mounting frame, as best shown in FIG. 7.

Upright mounting plates 39 are secured, as by welding, on the channel iron frame 26. A rear tool bar 40 is borne by the mounting plates and is composed of two axially aligned sections 41. The sections of the tool bar are aligned along a longitudinal axis 42 of the tool bar in upwardly spaced relation from the channel iron frame along the rearward edge of the platform 25 with respect to the normal direction of travel of the tractor 11. Thus, when the apparatus 10 is mounted on a tractor 11, the tool bars are disposed in horizontal attitudes extending in substantially right angular relation to and transversely of the normal direction of travel of the tractor. More specifically, when the apparatus is mounted on the tractor as shown in FIGS. 1 and 2, the longitudinal axis 42 of the rear tool bar extends in right angular relation to the normal direction of travel of the tractor and is horizontal.

The apparatus 10 is borne by the tractor 11 in the relationship shown in FIGS. 1 and 2 by mounting of the apparatus on the three point hitch 14 of the tractor 11. More specifically, the front tool bar 29 is mounted by any suitable means on the lower portion of the three point hitch so as to extend horizontally, transversely of the normal direction of travel of the tractor. A pair of linking arms 43 are mounted on and extend in diverging relation from the upper portion of the three point hitch to the rear tool bar 40 where they are secured by any suitable means. The linking arms and front tool bar thus mount the apparatus on the tractor so as to support the platform 25 in a substantially horizontal attitude shown in FIGS. 1 and 2 extending transversely of the normal direction of travel of the tractor. In the conventional fashion, the three point hitch can be raised and lowered using the hydraulic system of the tractor to move the wheel 33 borne by the platform 25 to and from earth engagement. In this manner, the platform is always retained in a horizontal attitude during movement of the three point hitch using the hydraulic system of the tractor.

A pair of ski assemblies 50 are mounted on the platform 25. Each ski assembly has a pair of clamp assemblies 51 one of which is secured on the front tool bar 29 and the other of which is secured on the rear tool bar 40. The clamp assemblies of each ski assembly are aligned with each other parallel to the normal direction of travel of the tractor and spaced from the wheel assembly 30 a distance such as shown in FIG. 2. The clamp assemblies can, of course, be moved to any desired position along the tool bars, but the described positions are preferred for normal use as will hereinafter be described. Each ski assembly has a pair of legs 52 individually received in and secured by its respective clamp assemblies 51 in parallel relation extending downwardly through and below the platform, as shown in FIGS. 2 and 3. A ski 53 is mounted on the lowermost ends of the legs of each ski assembly in horizontal relation parallel to the normal direction of travel of the tractor. When the ski assemblies 50 and wheel assembly 30 are positioned as described, it will be understood that the apparatus thereby is segregated into four work stations or zones 54, as can be visualized in FIG. 2.

A pair of clamp assemblies 59 are individually mounted on the front tool bar 29 adjacent the terminal ends thereof. A front support frame 60 is affixed in upright relation on the front tool bar, as shown in FIG. 1. The front support frame supports sacks 61 at suitable locations containing seed to be planted. A rear support frame 62 is mounted on the rear tool bar 40. The rear support frame has four upright legs 63 which are individually secured on the rear tool bar by clamp assemblies 64 so as releasably to mount the legs in upright relation, as best shown in FIG. 2. The upper ends of the legs are interconnected by a horizontal cross member 65 extending substantially parallel to the rear tool bar. Four oblique arms 66 are mounted on the cross member 65 extending upwardly and rearwardly therefrom with respect to the normal direction of travel of the tractor. The distal ends of the arms are interconnected by an upper cross member 67 extending substantially parallel to the cross member 65.

Figure 6:
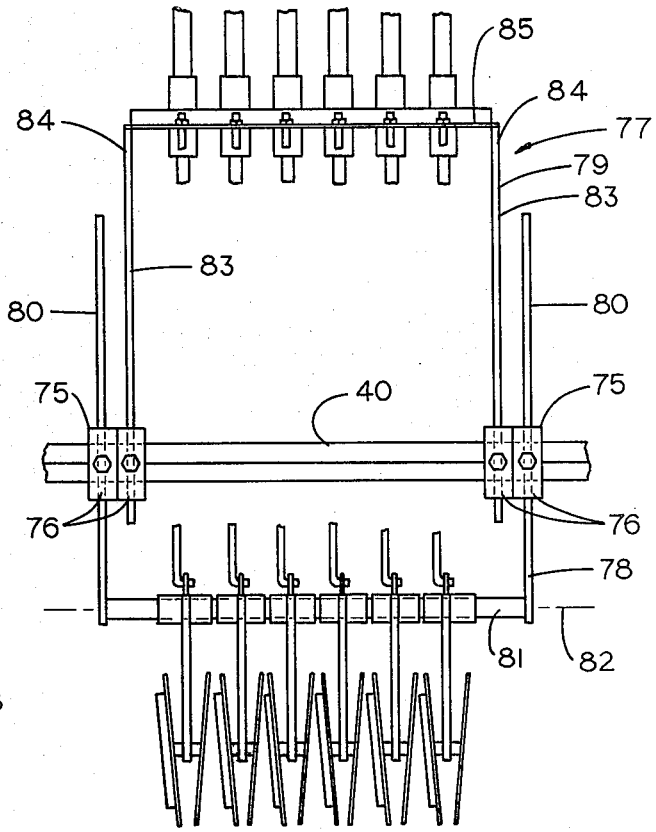
FIG. 6 is a fragmentary rear elevation of a subframe of the apparatus showing the various operative components thereof.

Within each zone 54 of the platform 25, a pair of subframe clamp assemblies 75 are affixed on the rear tool bar 40 in rearwardly facing relation with respect to the normal direction of travel of the tractor 11. The subframe clamp assemblies of each zone are spaced from each other a predetermined distance and each has a pair of side-by-side, rearwardly extending clamp portions 76. A subframe 77 is mounted on each pair of subframe clamp assemblies. Each subframe is composed of a lower secondary frame 78 and an upper secondary frame 79, as best shown in FIG. 6. The lower secondary frame 78 of each subframe 77 has a pair of substantially parallel legs 80 individually received in the outer corresponding clamp portions 76 of the pair of clamp assemblies 75 of that subframe. The lower ends of the legs 80 are interconnected by a shaft or axle 81 having a longitudinal axis 82 parallel to the rear tool bar 40.

The upper secondary frame 79 of each subframe has a pair of legs 83 individually received in and secured on the other corresponding clamp portions 76 of the pair of clamp assemblies 75 of that subframe, as best shown in FIG. 6. The upper ends of the legs 83 mount oblique arms 84 extending upwardly and rearwardly therefrom with respect to the normal direction of travel of the tractor and parallel to each other. The upper ends of the oblique arms are interconnected by an angle iron cross member 85 which is substantially parallel to the rear tool bar 40. Each angle iron cross member has a plate 86 through which bores 87 are extended in predetermined positions.

Figure 5:
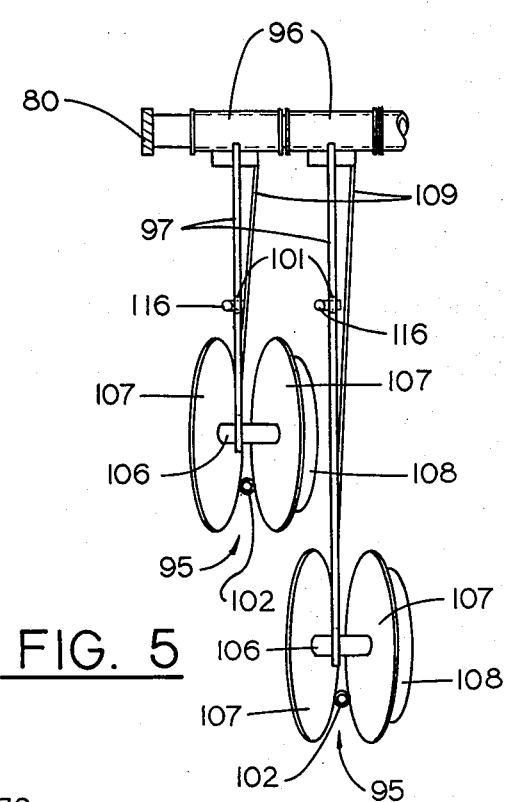
FIG. 5 is a fragmentary horizontal section taken on line 5—5 in FIG. 3.

Each subframe 77, and more specifically the lower secondary frame 78 thereof, in the preferred embodiment, mounts six arm assemblies or planting units 95. Each of the planting units has a mounting sleeve 96 pivotally mounted on the axle 81 of the lower secondary frame for pivotal movement about the longitudinal axis 82 of the axle. Each planting unit has an arm 97 mounted, as by welding, on its respective sleeve 96 for pivotal movement with the sleeve about the longitudinal axis of the axle. The arms are extended from the axle in the right angular relation thereto and are of alternately short and long lengths, as shown in FIGS. 1, 3 and 5. Thus, each arm has a horizontal portion 98 which may be of the short length shown on the left in FIG. 5 or alternatively the long length shown on the right in FIG. 5. In all other respects, the planting units are identical. Each arm 97 has a vertical portion 99 disposed in right angular relation to the horizontal portion 98 and has a return bent portion 100 extending along a course substantially parallel to the horizontal portion of the arm. Thus, it will be seen that the arms of each subframe are of staggered lengths and are independently pivotal about the axle 81.

A ring 101 is affixed on the horizontal portion 98 of each arm 97. The rings of the arms are disposed in corresponding positions aligned along an axis parallel to the rear tool bar 40. A planting tube 102 is secured, as by welding, on the vertical portion 99 of each arm and has a terminal end 103 extending beyond the return bent portion 100 of its respective arm and an opposite upper end 104 extending beyond the horizontal portion of each arm in the opposite direction. The planting tube is, as can best be seen in FIG. 4, of a tapered configuration tapering inwardly from its upper end to its terminal end.

A disk assembly 105 is mounted on the return bent portion 100 of each arm 97. Each disk assembly has a shaft 106 extending through the return bent portion of its respective arm parallel to the longitudinal axis 92 of the axle 81. A pair of convergent disk blades 107 are individually rotationally mounted on the ends of the shaft on opposite sides of the arm, as best shown in FIGS. 5 and 6. A gauge housing 108 is mounted on the outer face of one of the pair of disk blades concentric to the outer periphery of the blade and inwardly spaced therefrom to act as a depth control preventing extension of the blades into the earth beyond the predefined limit. As best shown in FIG. 5, the horizontal portion of each arm is reinforced by a diagonal brace 109.

A spring or guide assembly 115 interconnects each arm assembly 95 and the angle iron cross member 85 of its respective upper secondary frame 79. Each guide assembly has a rod 116 pivotally connected to the ring 101 of its respective arm and extended upwardly through a predetermined bore 87 of the plate 86 of the cross member to an upper end portion 117 above the plate 86. A stop 118 is mounted on the upper end portion of the rod on the opposite side of the plate 86 from its respective arm 97. The stop is preferably screw threadably adjustable on the upper end portion 117 of the rod for adjustable positioning axially along the rod. A collar 119 is secured on the rod in a predetermined position in spaced relation to and below the plate 86. A compression spring 120 is captured between the collar 119 and the plate 86 extending about the rod and thus urging the rod and arm 97 connected thereto downwardly so as resiliently to maintain the stop 118 in engagement with the plate 86, as can best be visualized in FIG. 3. Thus, it will be seen that each of the planting units 95 is independently pivotal about the longitudinal axis 82 of the axle 81 of its respective subframe 77 from a position such as shown in FIG. 3 to a position upwardly disposed therefrom. Thus, during earth traversing movement, when a disk assembly 105 engages debris, the disk assembly and arm thereof are pivoted upwardly against the action of the compression spring 120 so as to permit the disk assembly to ride over the debris without interfering with the operation of the apparatus 10. Gravity and the compression spring 120 return the disk assembly and arm to the position shown in FIG. 3 after the disk assembly passes over the obstruction. Screw threaded adjustment of the stop 118 axially along the rod allows selection of the precise position to which the disk assembly and arm are returned.

A pair of parallel support shafts 125 are mounted on and interconnect the oblique arms 84 of the upper secondary frame 79 of each subframe 77 substantially parallel to the angle iron cross member 85 thereof. Six seed metering devices 126 are individually slidably mounted on the pair of support shafts in side-by-side relation, as best shown in FIGS. 1, 2 and 3. The seed metering devices are preferably of a type closely similar to that disclosed in the Morgan et al. U.S. Pat. No. 3,048,132. The seed metering devices, however, have been modified in the subject invention from that of the Morgan patent to incorporate a case 127 as shown in the foregoing patent, but having a convergent discharge housing 128 mounted thereon. The discharge housing mounts a flexible conduit 129 which is at its distal end connected in seed supplying relation to the upper end 104 of the planting tube 102, as best shown in FIG. 3.

A drive shaft 130, composed of a pair of sections 131 individually rotationally mounted in axially aligned bearings 132 secured on the rear support frame 62, is operably extended through the metering devices 126 of all of the subframes 77, as best shown in FIG. 2. The internal operating structure, not shown, of each metering device is fastened on the drive shaft for rotation therewith by a cotter pin extending through a hole in the drive shaft. By removing the cotter pins from the holes of the drive shaft, the metering devices can individually be slidably repositioned along the drive shaft as desired. The cotter pins can then be extended through other holes in the drive shaft provided for the purpose to again establish the metering devices in driven relation to the drive shaft. The specific internal structure and operation of the metering devices themselves in dispensing seed, is shown and described in the foregoing patent and need not be repeated here. The sections 131 of the drive shaft 130 are aligned for rotation about an axis of rotation 133 which is parallel to the longitudinal axis 42 of the rear tool bar 40. Each section of the drive shaft has opposite end portions 134. Each seed metering device mounts a supply pipe 135 extending upwardly and slightly forwardly therefrom, as best shown in FIG. 3. The supply pipes 135 of all of the metering devices 126 of each subframe 77 mount a hopper 136 in feeding relation thereto. Thus, it will be seen that seed contained within the hopper 136 of each subframe, falls gravitationally through the supply pipes 135 of that subframe in feeding relation to the metering devices. Rotation of the drive shaft 130 causes seed to be metered therefrom and to fall gravitationally down the flexible conduit 129 and into the earth through the planting tube 102. Each hopper is preferably fastened on the rear support frame 62 by suitable nut and bolt assemblies, not shown. However, these can easily be removed to permit a hopper to be repositioned with its respective subframe along the rear tool bar 40. Subsequently, the nut and bolt assemblies can conveniently be re-employed to fasten the hopper on the rear support frame 62 using suitable holes therein provided for the purpose.

The apparatus 10 has a drive assembly 140 shown in FIG. 7. The drive assembly includes a pair of mounting brackets 141 mounted on the channel iron frame 26 in upwardly facing relation. A pair of bearings 142 are individually mounted on the brackets and aligned along an axis parallel to the rear tool bar 40. A shaft 143 is rotationally mounted in the bearings and extends to opposite end portions 144 on opposite sides of the brackets. A large sprocket 145 is mounted on the opposite end portion of the shaft 143 on the right as viewed in FIG. 7. A small sprocket 146 is mounted on the opposite end portion 144 of the shaft 143 on the left as viewed in FIG. 7. A small sprocket 147 is mounted on the right terminal end 34 of the axle 32 in a plane right angularly related to the tool bar 40. A drive chain 148 is operably extended about the large sprocket 145 and the small sprocket 147 so that rotation of the wheel 33 by earth engagement is transferred to the shaft 143.

A mounting plate 149 is affixed on the channel iron frame 26 extending rearwardly therefrom with respect to the normal direction of travel of the tractor 11. A pair of bearings 150 are mounted on the plate in alignment along an axis parallel to the rear tool bar 40. A shaft 151 is rotationally mounted in the bearings and has opposite end portions 152 extending on opposite sides of the bearings. A sprocket 153 is mounted on the shaft for rotation therewith in a plane with sprocket 146 extending in right angular relation to the rear tool bar. A drive chain 154 is extended about and operably interconnects the small sprocket 146 and the sprocket 153 in drive transferring relation.

A pair of small sprockets 155 are individually mounted on the opposite end portions 152 of the shaft 151 for rotation therewith. A pair of larger sprockets 156 are individually mounted on the adjacent opposite end portions 133 of sectons 131 of the drive shaft 130 individually contained in planes with the small sprockets 155. A pair of drive chains 157 are extended about and operably interconnect the corresponding small sprockets 155 and larger sprockets 156 in drive transferring relation. A chain tightening assembly 158 is mounted at any suitable location on the apparatus and contains a shaft 159 on which are rotationally mounted rollers 160 in individual engagement with the drive chains 157, as shown in FIG. 7. It will be understood that the shaft 159 can be moved toward and from the chain so as to tighten or loosen the chain with respect to the sprockets as desired.

OPERATION

The operation of the described embodiment of the subject invention is believed to be clearly apparent and is briefly summarized at this point. The apparatus 10 is mounted on the three point hitch 14 of a tractor 11 in the manner already described and shown in FIG. 1. Thus, the operator 12 of the tractor, using the hydraulic system of the tractor can raise and lower the aparatus to and from earth engagement. The operable configuration of the apparatus is as shown in FIGS. 1, 2 and 3 wherein the disk assemblies 105 of the planting units 95 are disposed in engagement with the parallel beds of earth 16, as shown in FIG. 2. Thus, all of the disk assemblies of each planting unit 95 are in engagement with their respective bed of earth 16 as shown in FIG. 2. The apparatus is positioned so that the wheel 33 rides in a furrow 17 and the ski assemblies 50 ride in furrows on opposite sides of the furrow within which the wheel 33 rides. The clamp assemblies 51 are adjusted to position the legs 52 of the ski assembly so that the skiis 53 thereof are in rested engagement with the earth when the disk assemblies are in engagement with their respective beds of earth, preferably with the gauge housings 108 resting on the upper surface 18 of the beds of earth so that the disk blades are slightly below the upper surface.

It will be seen that if any of the subframes 77 are not aligned precisely with their respective beds of earth 16, the clamp assemblies 75 can be loosened to move any such subframe along the rear tool bar 40 for precise alignment with its respective bed of earth 16. The metering devices 126 can be disconnected from driven relation with the shaft 130 and the hopper 136 from the rear support frame 62 as already described to permit such adjustment. If the secondary frames 78 and 79 are not adjusted as desired relative to each other, the clamp portions 76 can be adjusted to move the secondary frames upwardly or downwardly relative to the apparatus or to each other as desired.

If any subframe is moved laterally along the rear tool bar 40 it will be seen that the seed metering devices 126 can be moved therewith axially along the drive shaft 130 without disconnecting the metering devices other than by removal of the cotter pins as already described. If, alternatively, the seed metering devices 126 need be adjusted relative to each other, they can be moved slidably on both the drive shaft 130 and the support shafts 125 to the positions desired without disassembling the metering devices except for removal of the cotter pins and while still retaining the metering devices in supported position on the support shafts 125. When the cotter pins are reinserted as described, the metering devices are again established in driven relation to the drive shaft. The hoppers 136 can be adjusted as previously described. The guide assemblies 115 are moved with the respective subframe as adjusted so as not to require disassembly.

Once the apparatus 10 is arranged as described and positioned relative to the beds of earth 16 and furrows 17, operation of the apparatus can begin. The tractor 11 moves in its normal direction of travel along a path parallel to and over the beds of earth and furrows so that the ski assemblies 50 and wheel 33 move along and within their respective furrows. The disk assemblies thus are caused to move along parallel paths along the upper surfaces 18 of their respective beds of earth so as to form shallow indentations or furrows in the upper surface. Movement of the wheel 33 in earth engagement causes drive to be transferred by the drive assembly 140 from the wheel through the drive assembly, as shown in FIG. 7, to rotate the sections 131 of the drive shaft 130 and thereby operating the seed metering devices 126.

The seed metering devices 126 thus dispense seed from their hopper 136 through the flexible conduits 129 to the planting tubes 102. The seeds fall sequentially into the shallow indentation or furrow of their respective disk assembly during continued earth traversing movement. In view of the staggered relationship of the disk assemblies 105 of each subframe 77, the rearwardmost disk assemblies in forming their own respective indentations or furrows cause earth to be deposited over the seed received in the furrows formed by the preceding disk assemblies thereby accomplishing covering of the seed without further attention. The seed deposited in the furrows of the rearwardmost disk assemblies are covered normally sufficiently simply by gravitational subsiding of the earth back into the small furrow. It has been found that it is generally unnecessary to use any sort of a device to cover the seeds further.

When any of the disk assemblies 105 encounter debris such as rocks, clods, trash or the like during movement along their respective beds of earth 16, the resistance encountered causes the disk assembly involved to ride upwardly over the obstruction as permitted by pivotal movement of its respective arm 97 about the longitudinal axis 82 of the axle 81 and against resistance of the compression spring 120. This insures that continued operation of the apparatus 10 is unimpaired while allowing the given disk assembly to free itself from such an obstruction. Gravity and the compression spring insure that the disk assembly is forced back into the upper surface 18 of its respective bed of earth for formation of its individual furrow immediately upon passing over the obstruction. The stop 118 prevents movement of its respective arm in a downward direction beyond its preselected limit.

Therefore, the apparatus of the present invention is operable to plant seeds simultaneously in a plurality of individual beds of earth during earth traversing movement operating automatically to free itself from obstructions encountered during such earth traversing movement and permitting the operable components of the apparatus to be adjusted relative to each other without any substantial disassembly of the unit while still retaining the operable characteristics desired.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desired to secure by Letters Patent is:

1. Apparatus for simultaneously planting seeds in a plurality of adjacent beds of earth separated by substantially parallel furrows, the apparatus comprising, in combination:
   (a) a main frame;
   (b) attachment means for mounting the main frame on a vehicle for movement with the vehicle over beds of earth disposed along a path in a predetermined direction of travel substantially parallel to furrows associated with the beds of earth;
   (c) a subframe having an axle and an upper portion;
   (d) mounting means for attaching the subframe on the main frame with the axle of the subframe being oriented substantially horizontally and transversely of the predetermined direction of travel;
   (e) a plurality of arms mounted on the axle of the subframe for independent pivotal movement about the axle thereof in individual, spaced, substantially parallel, planes substantially normal to the associated axle, each of the arms having a horizontal portion pivotally mounted on the axle and a vertical portion disposed in right angular relation to the horizontal portion, the horizontal portion of at least one of the arms being of a length greater than the horizontal portion of at least one of the other of the arms; and
   (f) a plurality of planting heads each having a forward portion and a rearward portion relative to the predetermined direction of travel, each of the planting heads being borne by a vertical portion of a respective one of the arms associated with the subframe, attachment of each of the planting heads to the subframe being at a point remote from the horizontal portion of the associated arm and in trailing relation to the axle of the subframe with respect to the predetermined direction of travel, each of the planting heads being arranged for forming a depression in earth being traversed as the respective one of the planting heads is moved in the predetermined direction of travel and in engagement with the earth.

2. Apparatus as defined in claim 1, wherein the subframe further include spring assembly means associated therewith for interconnecting the upper portion of the subframe with the horizontal portion of an associated one of the arms for resiliently urging the respective one of the planting heads downwardly into earth engagement while permitting the associated one of the planting heads to ride over high ground, and the like.

3. Apparatus as defined in claim 1, wherein the horizontal portion of each of the arms is arranged above an associated one of the planting heads, each of the planting heads comprising a pair of convergent disk blades, a shaft mounted on an associated one of the arms, the disk blades individually rotationally mounted on the shaft on opposite sides of the one of the arms.

4. Apparatus as defined in claim 3, wherein a plurality of seed metering devices are mounted on the upper portion of the subframe, each above a respective one of the arms associated with the subframe, a single drive shaft mounted for rotation about a longitudinal axes thereof and interconnected to the seed metering devices for operating same simultaneously, a plurality of conduits connecting each unit to a respective one of the seed metering devices with the rearward portion of a one of the planting heads associated with the subframe, the conduits being arranged in seed supplying relation to the planting heads, a plurality of hoppers arranged for holding seed, each of the hoppers being connected in seed supplying relation to a respective one of the seed metering devices, a wheel mounted on the main frame and arranged for riding in an associated furrow, and a drive assembly arranged operably interconnecting the wheel and the drive shaft for transferring motion from the wheel to the drive shaft and rotating the drive shaft in order to operate the seed metering devices when the main frame is moved in the predetermined direction of travel over associated beds of earth, a plurality of subframes each like the one subframe, with the wheel being arranged in an associated furrow and the plurality of subframes being adjustably mounted on the main frame and arranged for passing over the beds of earth, the subframes each forming a zone, and the arms of the subframes being mounted for riding over the beds of earth without changing the shape of the beds of earth.

5. Apparatus as defined in claim 4, wherein the main frame has a tool bar disposed in substantially horizontal relation substantially transversely of the predetermined direction of travel, and each of the subframes is comprised of a pair of secondary frames, one of the secondary frames mounting the one of the arms associated with the respective one of the subframes and the other of the secondary frames mounting a respective one of the seed metering devices, clamp means securing the secondary frames on the tool bar of the main frame in an adjustable manner for permitting independent positioning of the secondary frames relative to one another in a vertical direction and unitary positioning of the secondary frames along the tool bar.

6. Apparatus as defined in claim 5, wherein the seed metering devices of each of the sets of subframes are slidable axially along the drive shaft upon individual disconnection therefrom, a supporting shaft borne by the upper most secondary frame substantially parallel to the drive shaft, the seed metering devices being slidably mounted on the support shaft, for permitting the seed metering devices to be individually positioned with respect to a respective one of the subframes by slidable movement along the drive shaft after a disconnection of a respective one of the seed metering devices and relative to an associated one of the subframes by slidable movement along the drive shaft and supporting shaft.

7. Apparatus as defined in claim 6, wherein the wheel is mounted on the main frame substantially central thereof and deployed to travel along and within an associated furrow, a pair of skiis mounted on the main frame and individually positioned on opposite sida of the wheel in spaced relation to the wheel and arranged for traveling along and within adjacent furrows, there being four subframes arranged for defining four zones on the main frames spaced from one another and dimensioned individually to pass over one of the beds of earth during movement along the predetermined direction of travel.

8. Apparatus as defined in claim 7, wherein each of the seed metering devices supports an associated one of the hoppers, and is connected in seed receiving relation to a respective one of said hoppers.

9. Apparatus as defined in claim 8, including a plurality of spring assemblies each forming means for biasing a respective one of the planting heads downwardly into earth engagement.

* * * * *